(12) United States Patent
Hagen et al.

(10) Patent No.: US 11,080,398 B2
(45) Date of Patent: Aug. 3, 2021

(54) IDENTIFYING SIGNATURES FOR DATA SETS

(71) Applicant: Trend Micro Incorporated, Tokyo (JP)

(72) Inventors: Josiah Dede Hagen, Austin, TX (US); Jonathan Edward Andersson, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 276 days.

(21) Appl. No.: 15/988,949

(22) Filed: May 24, 2018

(65) Prior Publication Data

US 2018/0268141 A1 Sep. 20, 2018

Related U.S. Application Data

(63) Continuation of application No. PCT/US2015/067169, filed on Dec. 21, 2015.

(51) Int. Cl.
*G06F 21/56* (2013.01)
*G06F 21/64* (2013.01)
*G06F 16/13* (2019.01)
*H03M 7/30* (2006.01)

(52) U.S. Cl.
CPC .......... *G06F 21/564* (2013.01); *G06F 16/137* (2019.01); *G06F 21/64* (2013.01); *G06F 2221/034* (2013.01); *H03M 7/30* (2013.01)

(58) Field of Classification Search
CPC ....... G06F 21/564; G06F 16/137; G06F 21/64
See application file for complete search history.

(56) References Cited

U.S. PATENT DOCUMENTS

| | | | |
|---|---|---|---|
| 7,624,446 B1* | 11/2009 | Wilhelm | H04L 63/1416 380/255 |
| 7,802,303 B1 | 9/2010 | Zhao et al. | |
| 9,094,288 B1* | 7/2015 | Nucci | H04L 43/026 |
| 2004/0157556 A1 | 8/2004 | Barnett et al. | |
| 2009/0132461 A1 | 5/2009 | Garg et al. | |
| 2009/0320133 A1* | 12/2009 | Viljoen | G06F 21/564 726/24 |
| 2011/0067106 A1 | 3/2011 | Evans et al. | |
| 2011/0154495 A1 | 6/2011 | Stranne | |
| 2014/0201836 A1* | 7/2014 | Amsler | H04L 63/20 726/23 |

(Continued)

*Primary Examiner* — Farid Homayounmehr
*Assistant Examiner* — Suman Debnath
(74) *Attorney, Agent, or Firm* — Okamoto & Benedicto LLP (57) ABSTRACT

Examples relate to identifying signatures for data sets. In one example, a computing device may: for each of a plurality of first data sets, obtain a data set signature; generate a first data structure for storing each data set signature that is distinct from each other data set signature; for each of a plurality of second data sets, obtain at least one data subset; generate a second data structure for storing each data subset; remove, from the first data structure, each data set signature that matches a data subset included in the second data structure; and for each data set signature removed from the first data structure, identify each first data set from which the data set signature was obtained; and for each identified first data set, obtain a new data set signature.

11 Claims, 5 Drawing Sheets

(56) References Cited

U.S. PATENT DOCUMENTS

2014/0279808 A1* 9/2014 Strassner .............. G06Q 10/10
                                                    706/47
2015/0244733 A1* 8/2015 Mohaisen ............ G06F 21/561
                                                    726/23
2017/0300691 A1* 10/2017 Upchurch ............ G06F 21/563

* cited by examiner

IDENTIFYING SIGNATURES FOR DATA SETS

CROSS-REFERENCE TO RELATED APPLICATION

This application is a continuation of International Application No. PCT/US2015/067169, with an International Filing Date of Dec. 21, 2015, which is incorporated herein by reference in its entirety.

BACKGROUND

Data signatures are often used when attempting to identify or match sets of data without the need to compare full data sets. For example, computer virus signatures may be calculated by hashing known computer viruses and using the hash results as signatures. Unknown computer files can be hashed and the results may be compared to the computer virus signatures, and matches may indicate that the unknown files are computer viruses. Data signatures may also be used in other contexts, such as the detection of plagiarism and biometric identification using fingerprinting or DNA.

BRIEF DESCRIPTION OF THE DRAWINGS

The following detailed description references the drawings, wherein.

DETAILED DESCRIPTION

To assist with identifying and matching data sets, data signatures are often smaller than their corresponding data sets, e.g., to reduce the amount of data to be compared. By selecting a portion of a data set as a data signature, the relatively small signature may be matched against unknown data sets more quickly than comparing entire data sets. To reduce false positives, relatively complex portions of data sets may be selected as signatures, in a manner designed to reduce the likelihood that data signature would match different data sets. While false positives may be reduced by using complex portions of data sets as signatures, matches may be increased relative to other signature methods, such as hashing, because the likelihood of complex portions of data sets matching may be greater than the likelihood of file hashes matching.

In some situations, matching a signature for one data set against multiple other data sets may be desirable. For example, in the context of malicious computer files, a data signature generated via hashing the malicious file is likely to only match against the exact same malicious file. Even an insignificant change to the malicious file would likely change the hash value of the file, and anti-malware measures designed to match based on file hashes may, due to the minor change, miss malicious files. In situations where a complex portion of a malicious file is selected as the signature, changes to any other portion of the malicious file would still result in a match. For example, if 20 lines of obfuscated code in a malicious file, out of 1,000 lines, are used as a signature for the malicious file, a different file with changes to any of the other 980 lines of code wouldn't avoid detection by a device using the signature to detect malware.

In some situations, signatures that are distinct from other data signatures are desirable, e.g., to avoid false positives in identifying data sets and to accurately identify data sets that match a signature. Depending on the data sets, truly unique data signatures may be difficult to identify; however identifying data signatures that are more likely to be distinct is still advantageous. As used herein, data signatures are distinct, or more distinct, from other data signatures if they match less data signatures or data subsets, or if they match data subsets of a lower cost. For example, when data signatures are compared with many millions of data subsets and other data signatures, some collisions, or matches, may occur. A data signature that collides with, or matches, 10 other data subsets or data signatures may be considered more distinct than another data signature that collides with, or matches, 20 other data subsets or data signatures. In another example, data subsets that data signatures are matched against may have an associated cost based on the type of data subset, e.g., matching a known benign subset may have a relatively high cost compared to matching an unknown/unfamiliar subset. Distinct data signatures are designed to match less data subsets and, if matches do occur, match data subsets of a relatively low cost.

To identify distinct data signatures for data sets, a computing system may collect many data sets for which signatures are desired and identify, for each data set, multiple candidate signatures. The candidate signatures may be placed into a data structure suitable for matching, such as a list, tree, or graph. Separate from this first data structure that includes candidate signatures of the data sets for which distinct signatures are desired, a second data structure may be filled with data subsets from other data sets, e.g., data sets that may include the original data sets for which signatures are desired as well as other data sets. The computing system may then compare each candidate signature in the first data structure to the data subsets in the second data structure to determine how distinct each candidate signature is. Candidate signatures that are unique, e.g., those that do not match any other data subsets included in the second data structure, are left in the first data structure. Candidate signatures that are not unique may be replaced by one of the other candidate signatures that were identified for the data set associated with the non-unique candidate signature. The process may continue, e.g., in an iterative fashion, until only unique data signatures are included in the first data structure, or until another stopping point has been reached, e.g., until a most distinct data signature is selected for data signatures that do not have any unique data signatures.

Data signatures may be identified for a data set in a variety of ways. In some contexts, more complex portions of data are more likely to be distinct, and the computing system may seek to identify complex portions of a data set to use as potential candidate signatures for that data set. One way to measure the complexity of data is by using compressibility. Relatively simple portions of data may be compressed more easily, e.g., to a smaller size, than more complex portions of data from the same data stream. For example, many compression algorithms compress data by taking advantage of repeated data or patterns, which may occur often in certain contexts, such as malicious files, creative writings, and biometric data. Another way to measure complexity of data is using entropy, where data having high entropy is more likely to be complex than data having low entropy. Malicious byte streams often attempt to hide malicious code within more traditional code, e.g., using obfuscation. Obfuscated portions of code are one example type of data that is more likely to be complex than un-obfuscated portions of code.

In some implementations, a computing device may be used to determine complexity by iteratively compressing portions of a data set. Using the results of the compression, the least compressible portions of the data set, e.g., the most complex portions, may be selected for use as candidate signatures for the data set. As indicated above, these candidate signatures may be stored and compared to other data subsets to identify one of the candidate signatures as a distinct signature for the corresponding data set. A data structure that includes distinct signatures may be used to attempt to match portions of other sets of data. Further details regarding the identification of distinct signatures for data sets are described in the paragraphs that follow.

Figure 1:
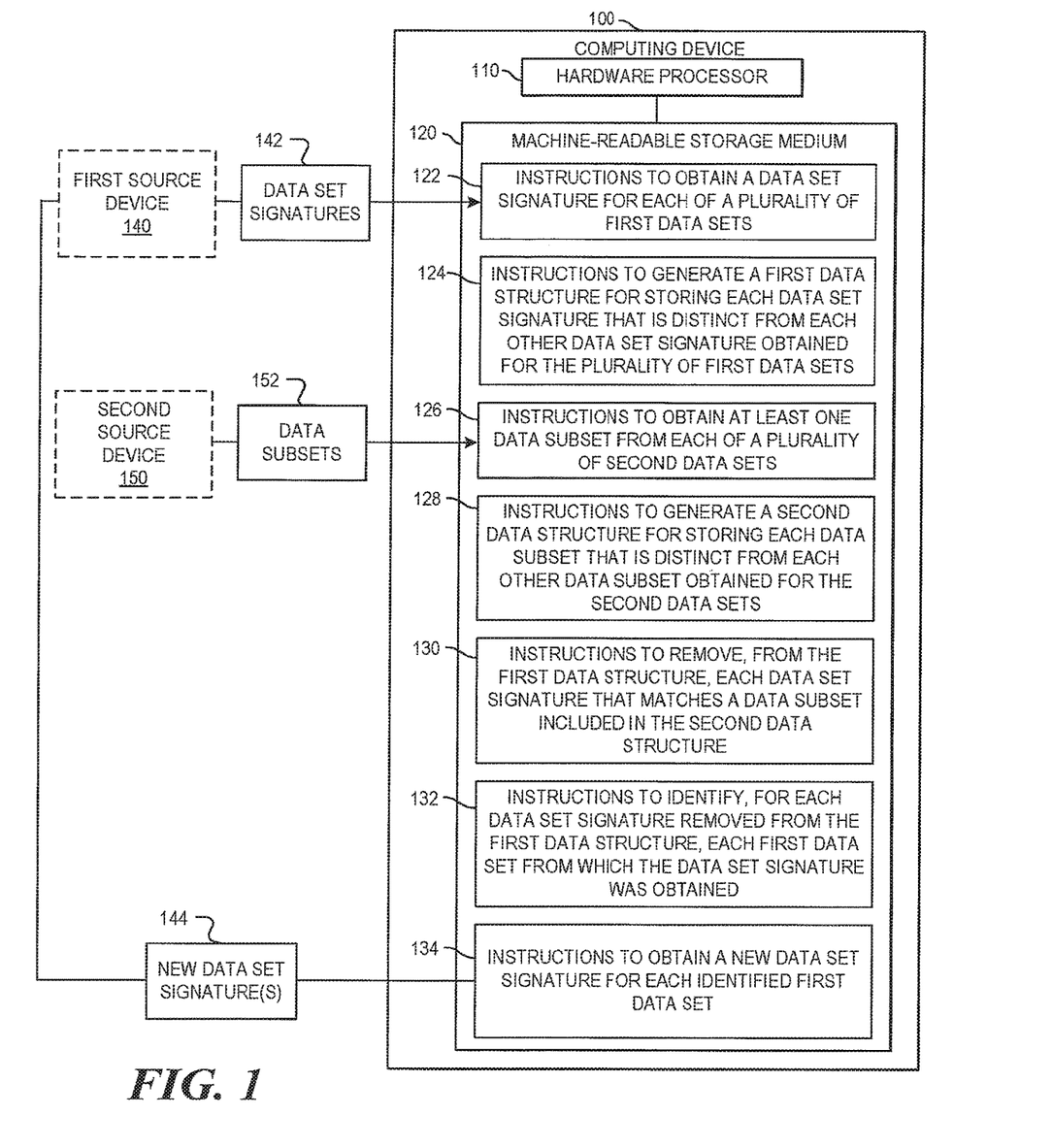
FIG. 1 is a block diagram of an example computing device for identifying signatures for data sets.

Referring now to the drawings, FIG. 1 is a block diagram of an example computing device 100 for identifying signatures for data sets. Computing device 100 may be, for example, a server computer, a personal computer, an intermediary network device, a mobile computing device, or any other electronic device suitable for processing data. In the embodiment of FIG. 1, computing device 100 includes hardware processor 110 and machine-readable storage medium 120.

Hardware processor 110 may be one or more central processing units (CPUs), semiconductor-based microprocessors, FPGA, and/or other hardware devices suitable for retrieval and execution of instructions stored in machine-readable storage medium 120. Hardware processor 110 may fetch, decode, and execute instructions, such as 122-134, to control the process for identifying signatures for data sets. As an alternative or in addition to retrieving and executing instructions, hardware processor 110 may include one or more electronic circuits that include electronic components for performing the functionality of one or more instructions.

A machine-readable storage medium, such as 120, may be any electronic, magnetic, optical, or other physical storage device that contains or stores executable instructions. Thus, machine-readable storage medium 120 may be, for example, Random Access Memory (RAM), an Electrically Erasable Programmable Read-Only Memory (EEPROM), a storage device, an optical disc, and the like. In some implementations, storage medium 120 may be a non-transitory storage medium, where the term "non-transitory" does not encompass transitory propagating signals. As described in detail below, machine-readable storage medium 120 may be encoded with a series of executable instructions: 122-134, for identifying signatures for data sets.

As shown in FIG. 1, the computing device 100 executes instructions 122 to obtain a data set signature for each of a plurality of first data sets. FIG. 1 depicts the data signatures 142 being provided by a first source device 140, which may be any device capable of communicating data signatures to the computing device 100, such as a data storage device, separate computing device, or user input device. The actual data included in the data signatures 142 may vary depending on the context. For example, in the context of malicious code detection, the data signatures 142 may include a subset of bytes from a malicious file or other source of malicious code. In the context of plagiarism detection, the data signature 142 may include a portion of the text of a novel, article, or essay. In the context of biometric identification, the data signatures may be a portion of a DNA sequence, fingerprint pattern, retinal or facial mapping, or the like, which may be expressed in a variety of ways.

The computing device 100 executes instructions 124 to generate a first data structure for storing each data set signature that is distinct from each other data set signature obtained for the first data sets. In some implementations, the first data structure is a deterministic acyclic finite state automata (DAFSA). For example, in the context of malicious data streams, the computing device 100 may obtain malicious byte signatures from a storage device and generate a DAFSA that includes each of the malicious byte signatures. In situations where malicious byte signatures collide with one another, or match, a new malicious byte signature may be obtained for one or both of the corresponding malicious byte streams. In some implementations, multiple data signatures are stored and ranked according to their complexity and, when needed, the computing device 100 may choose new signatures for data sets in order of their complexity. For example, when two malicious byte signatures match, the computing device may select the next most complex byte signature and use it to replace matching byte signature in the DAFSA.

In some implementations, prior to generating the first data structure, a collection of data sets are grouped based on measures of similarity. In this situation, a representative data set may be chosen from each group, and the chosen representative data sets may be the ones for which data signatures are obtained and placed into the first data structure. In some implementations, a set of data signatures may be chosen from a group of data sets. The grouping and selecting of representative data sets may be performed in a variety of ways. For example, data sets with matching signatures may be grouped together. In the malicious byte stream context, a malicious file may have many similar variants that have complex portions that are the same. In this situation, it may be desirable to use one byte signature from one of the variants, rather than one from each variant, due to potential difficulties in finding distinct signatures among the variants and the potential benefits of being able to identify new variants based on a byte signature common among a particular malicious file and its known variants. Some data sets may be grouped based on other measures of similarity. For example, in a gene sequencing context, data signatures that are known to represent certain genetic traits may be grouped together, e.g., to identify the most distinct data signatures that the groups have in common.

The computing device 100 executes instructions 126 to obtain at least one data subset 152 from each of a plurality of second data sets. FIG. 1 depicts the data subsets 152 being provided by a second source device 150, which may be any device capable of communicating data subsets to the computing device 100, such as a data storage device, separate computing device, or user input device. As with the data signatures 142, the actual data included in the data subsets 152 may vary depending on the context. For example, in the malicious code detection context, the data subsets 152 may be subsets selected from a variety of byte streams, including malicious byte streams, benign byte streams, and/or unknown byte streams. Generally, each data subset is comparable in size to the data signatures stored in the first data structure. In some implementations, data subset sizes/lengths are selected to match the sizes/lengths of the data set signatures.

The computing device 100 executes instructions 128 to generate a second data structure for storing each data subset that that was obtained from the second data sets. For example, the second data structure may be a tree generated by performing pairwise unification of DAFSAs generated for each data set. The DAFSAs for each data set include a plurality of subsets of the data set, and can be combined with other DAFSAs of other data sets to create one tree that includes data subsets from all data sets included in the second data sets, e.g., the malicious, benign, and unknown byte streams. DAFSAs may be combined, for example, by performing a union of the byte transitions that each allows. This may be performed iteratively, to construct a tree of DAFSAs, so that the root node of the tree is the union of all DAFSAs, corresponding to all of the byte subsets obtained from the second data sets. In some implementations, the tree may be organized so that data subsets that are expected to match the data signatures—e.g., the malicious byte signatures—are on one side of the tree, and data subsets that are not expected to match—e.g., byte subsets from benign and/or unknown byte streams—are on another side of the tree.

The computing device 100 executes instructions 130 to remove, from the first data structure, each data set signature that matches a data subset included in the second data structure. Data set signatures are selected for inclusion in the first data structure in a manner designed to ensure the signatures are distinct. A signature that matches a data subset included in the second data structure is not unique, except in implementations where signatures are intentionally included in the second data structure. In situations where unique signatures are desired, a signature that matches any data subset of the second data structure, except itself, is removed from the first data structure so that another data signature for the corresponding data set can be selected.

The computing device 100 executes instructions 132 to identify, for each data set signature removed from the first data structure, each first data set from which the data set signature was obtained. In situations where data set signatures are removed, the first data sets that corresponded to those removed data set signatures are identified so that new data signatures can be selected.

The computing device 100 executes instructions 134 to obtain a new data set signature 144 for each of the identified first data sets. For example, in situations where data set signatures are ordered by complexity for a data set, the next most complex data set signature may be selected. The new data set signature(s) 144 may be added to the first data structure in a manner similar to that described above for the original data set signatures 142. In some implementations, steps 130-134 may be repeated while inserting new data signatures to the first data structure for each signature removed.

In some implementations, the most distinct data set signatures are selected for inclusion in the first data structure, and the most distinct data set signatures, in some situations, may not be unique. For example, in situations where a unique data set signature is not found among the most complex data set signatures obtained for a particular data set, the computing device 100 may select the data set signature with the least collisions, or matches, with data subsets included in the second data structure. For example, if a first signature matches a first data subset included in the second data structure, and that first data subset occurred in five of the second data sets used to generate the second data structure, that first signature may be considered more distinct than a second signature that matches a second data subset included in the second data structure that occurred in ten of the second data sets used to generate the second data structure. In this implementation, additional information, such as the number of occurrences of each data subset, may be included in the second data structure.

As a result of steps 122-134, the first data structure includes distinct data set signatures that can be matched against unknown and/or new data sets to identify the unknown/new data sets as being the same as or similar to the first data sets from which the data set signatures were obtained. This may be useful, for example, in the context of malicious byte stream detection, where unknown data streams may be compared to a data structure that includes malicious byte signatures to determine whether the unknown data streams are potentially malicious. An example implementation of the identification of signatures for data sets, in the context of malicious byte stream detection, is described below with respect to FIGS. 2A, 2B, and 3.

Figure 2A:
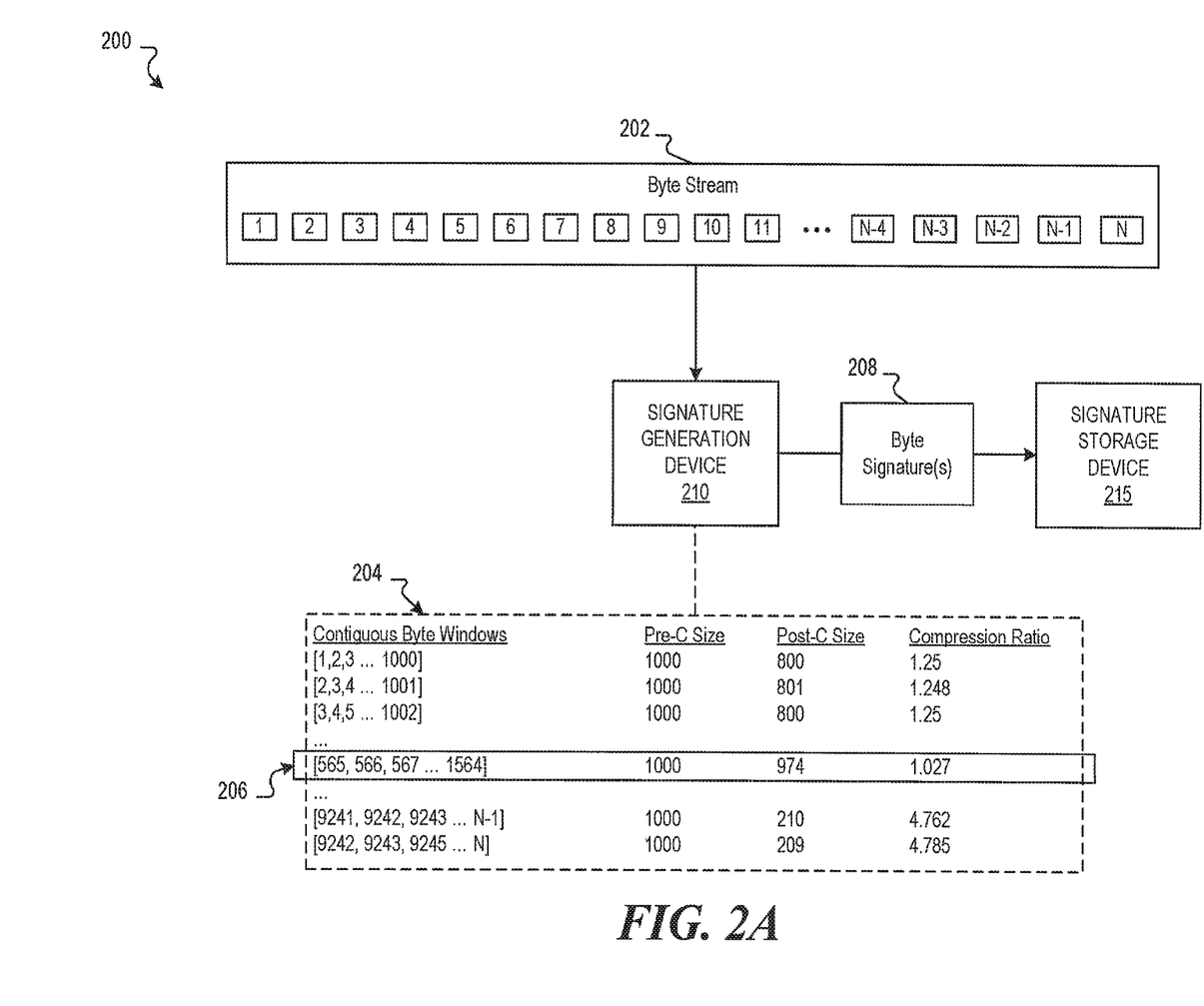
FIG. 2A is an example data flow for identifying a signature for a data set.

FIG. 2A is an example data flow 200 for identifying a signature for a data set. The data flow 200 depicts an example method of signature generation using a signature generation device 210, which may be implemented by a computing device, such as the computing device 100 described above with respect to FIG. 1. The example data set, byte stream 202, may be provided by any input device, such as one of the source devices 140, 150 described above with respect to FIG. 1.

During operation, the signature generation device 210 receives the byte stream 202. The byte stream 202 is depicted as including N bytes, labeled from byte 1 to byte N. The byte stream 202 may be, for example, a malicious software script provided to the signature generation device 210 in order to identify malicious byte signatures for identifying other occurrences of the malicious software script and/or its variants.

The signature generation device 210 iteratively determines a measure of complexity for windows of bytes included in the byte stream 202. Each window includes a distinct portion of the bytes included in the byte stream 202. The example data flow 200 depicts the iterative compression of various contiguous byte windows 204 to determine complexity. Each window has the same pre-compression size, e.g., 1,000 bytes, and a post-compression size and compression ratio that depends upon the bytes included in each window and the compression algorithm(s) used. The type of compression, e.g., compression algorithm used, may vary. By way of example, the signature generation device 210 may use zlib compression to compress distinct byte subsets of the byte stream. Other compression algorithms may also be used, for example, bz2, Lempel-Ziv-Markov chain (lzma), and Lempel-Ziv-Welch (lzw).

For example, the first window—from byte 1 to 1,000—is compressed to a size of 800 bytes for a 1.25 compression ratio, the second window—from byte 2 to 1,001—is compressed to 801 bytes for a compression ratio of 1.248, and the third window—from byte 3 to 1,002—is compressed to 800 bytes for a compression ratio of 1.25. The data flow 200 also depicts a window—from byte 565 to 1,564—as being compressed to 974 bytes for a compression ratio of 1.027, and the last two windows—from byte 9,241 to N−1 and 9,242 to N—as being compressed to 210 and 209 bytes for compression ratios of 4.762 and 4.785, respectively. While the example described with respect to FIG. 2 uses compressibility of bytes as a measure of complexity, other measures of complexity, such as entropy, may also be used, alone or in combination with compression, to determine a measure of complexity for the windows of bytes.

In the example data flow 200, the windows of bytes begin from the first byte and goes to the last byte, shifting by one byte each time. In some implementations, other methods may be used to perform iterative determinations of complexity on windows of bytes. For example, windows may be shift by more than one byte at a time, or even less, e.g., one bit at a time. In the implementation depicted in the example data flow 200, complexity is determined for windows in a manner designed to determine complexity of every distinct window of the byte stream. For example, no bytes are skipped or excluded from being compressed in at least one window. In some implementations, bytes may be skipped. For example, when working in a particular context, the signature generation device 210 may skip compression of portions of byte streams previously identified as benign. In some implementations, particular data units may be excluded. For example, in some particular context, data units with specific values may be excluded from complexity calculations.

The signature generation device 210 identifies, based on the iterative determinations, a most complex window 206 of bytes for the byte stream 202. This identification may be performed, for example, by determining which of the compressed windows has the smallest compression ratio. In the example data flow 200, the window 206 compressed from 1,000 bytes to 974 bytes for a compression ratio of 1.027 is identified as the least compressible window, e.g., because each other window of the byte stream 202 was compressed to a ratio greater than or equal to 1.027. In some implementations, the signature generation device 210 identifies multiple complex windows of bytes that are candidates for byte signatures. For example, the signature generation device may identify the five most complex, e.g., least compressible, windows of bytes.

The signature generation device 210 identifies the most complex windows, including window 206, as a candidate byte signatures 208 for the byte stream 202. In the example data flow 200, the signature generation device 210 provides the candidate byte signatures 208 to a signature storage device 215. The signature storage device 215 may be any device suitable of storing the candidate byte signatures 208, such as a separate network storage device, separate networking device, separate computing device, or a user output device. As noted above, signatures generated by the signature generation device 210 may be used to construct data structures which may be used in anti-malware devices to identify potentially malicious byte streams by matching unknown byte streams against malicious byte signatures.

Figure 2B:
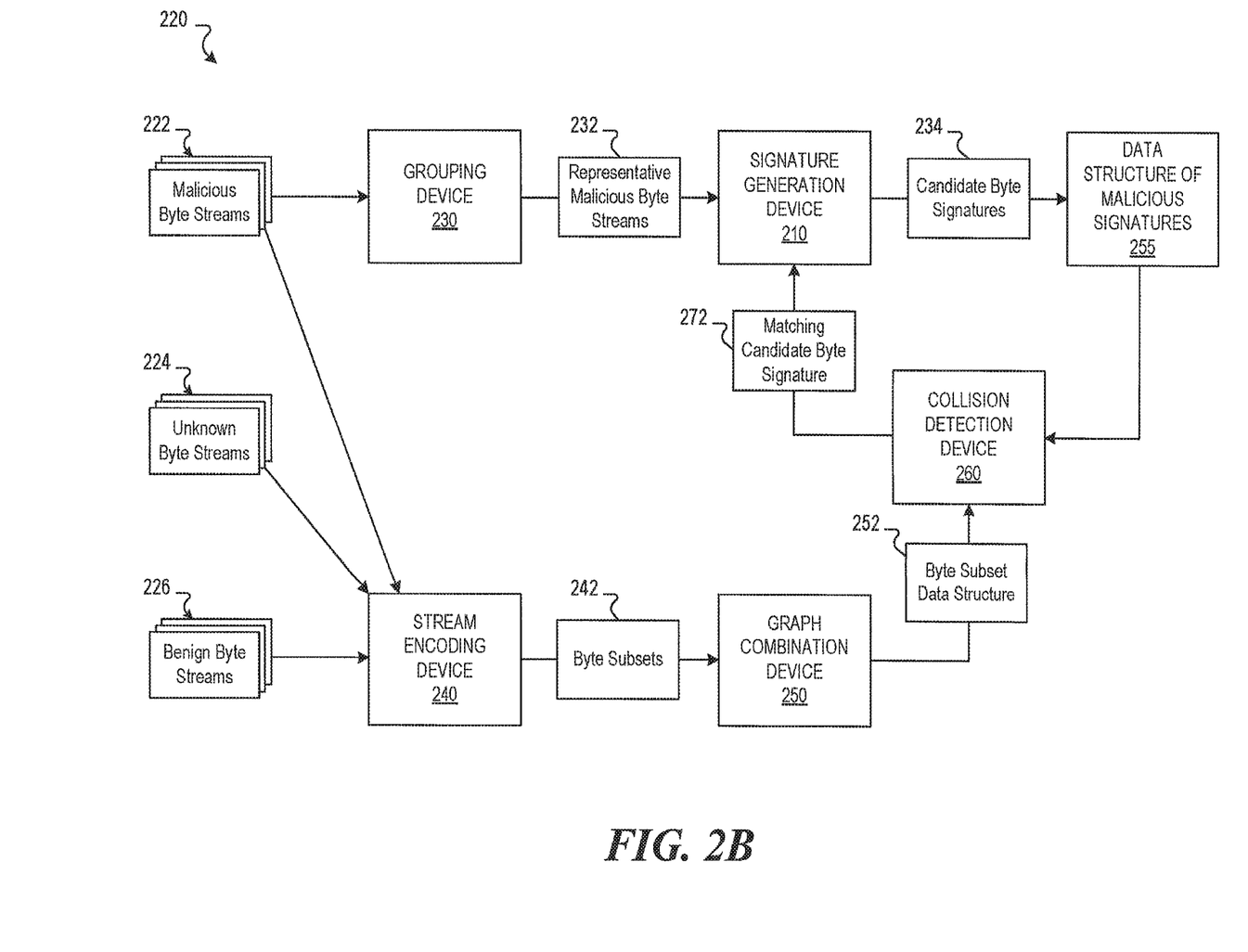
FIG. 2B is an example data flow for identifying signatures for data sets.

FIG. 2B is an example data flow 220 for identifying signatures for data sets. The example data flow 220 depicts one example implementation of a system for generating a data structure of malicious signatures using distinct byte signatures of malicious data streams. Variations of the data flow 220 could be used for a variety of data sets and for generating a variety of data set signatures. The example data flow 220 depicts several example devices for identifying malicious byte signatures, such as the grouping device 230, signature generation device 210, stream encoding device 240, graph combination device 250, and collision detection device 260. These example devices may be implemented in one or more computing devices, such as the computing device 100 described with respect to FIG. 1. The example devices may, in some implementations, be modules, e.g., implemented in hardware, software, or a combination thereof, included in a single computing device. Some of the operations described as being performed by some of the devices, such as the grouping device 230 and stream encoding device 240 may or may not be performed, or may be performed differently, depending upon the implementation. For example, operations described as being performed by separate devices may, in some implementations, be performed by one device or multiple devices. In addition, when operating in a context other than one involving malicious byte streams, example actions and devices described with respect to the data flow 220 may differ.

During operation, malicious byte streams 222 in the example data flow 220 are provided to both the grouping device 230 and the stream encoding device 240. Malicious byte streams 222 may be, for example, computer files, scripts, or other instructions previously identified as malicious. The grouping device 230 may perform a variety of different types of grouping of the malicious byte streams 222 to group malicious byte streams 222 into groups based on their similarity. This may be, for example, based on previously identified features or types associated with the malicious byte streams 222, direct comparisons of the byte streams, and/or signature comparisons when signatures have been created for the byte streams.

One representative malicious byte stream 232 from each group of malicious byte streams 222 is provided to the signature generation device 210. For example, a malicious byte stream 222 that is most similar to each other malicious byte stream 222 within its group may be selected as a representative malicious byte stream 232. In implementations where no grouping device 230 is used and/or no grouping is performed, every malicious byte stream 222 may be provided to the signature generation device 210 as a representative malicious byte stream 232.

The signature generation device 210 may, for example, perform the operations described with respect to FIG. 2A on the representative malicious byte streams 232. In this situation, the signature generation device 210 identifies one candidate byte signature 234 for each representative malicious byte stream 232, e.g., based on the complexity of subsets of the representative malicious byte streams 232. In some implementations, the signature generation device 210 generates multiple signatures for each representative malicious byte stream 232. In this situation, the signatures may be stored, e.g., in a signature storage device 215, and ranked for each byte stream based on their complexity. The signature generation device 210 may then use the most complex byte signature of each representative malicious byte stream 232 as the candidate signature for the byte stream.

The signature generation device 210 produces a data structure of malicious signatures 255 using the candidate byte signatures 234. For example, the signature generation device 210 may create a DAFSA for storing each candidate byte signature. In some implementations, the signature generation device 210 may perform some collision detection designed to ensure that candidate byte signatures are distinct from one another. For example, in a situation where the signature generation device 210 attempts to add a candidate byte signature 234 to the malicious signature DAFSA, and it already exists, the signature generation device 210 may select the next most complex byte signature identified for the corresponding malicious byte stream 222. The next most complex byte signature may then be added to the malicious signature data structure 255. As noted above, uniqueness of data signatures is not required, and most distinct byte signatures may, in some situations, be used to create the data structure of malicious signatures 255.

In the example data flow 220, the malicious byte streams 222 are also provided to the stream encoding device 240, along with unknown byte streams 224 and benign byte streams 226. In some implementations, the stream encoding device 240 may be provided with any combination of one or more of the different types of byte streams, e.g., malicious byte streams 222, unknown byte streams 224, and/or benign byte streams 226. Benign byte streams 226 are byte streams which are previously identified as likely to be non-malicious, or byte streams provided by a source trusted to be non-malicious. Unknown byte streams 224 may be any byte streams for which maliciousness is not known within a reasonable measure of certainty.

The stream encoding device 240 identifies byte subsets 242 for byte streams. Any number of byte subsets 242 may be identified for each byte stream provided to the stream encoding device 240. In some implementations, byte subsets 242 are identified in a manner similar to that of byte signatures, e.g., the stream encoding device selects, as byte subsets of a byte stream, contiguous windows of bytes included in the byte stream. The byte subsets 242 may, in some implementations, be of the same or similar in size to the candidate byte signatures 234. This may be useful, for example, when candidate byte signatures 234 are compared to data subsets 242 later in the process depicted in the data flow 220. In some implementations, the stream encoding device 240 provides byte subsets 242 of the byte streams in the form of DAWGs for each byte stream.

The graph combination device 250 generates a byte subset data structure 252 for storing distinct byte subsets provided by the stream encoding device 240. For example, in situations where byte subsets 242 are provided to the graph combination device 250 in the form of DAFSAs, the graph combination device 250 may perform pairwise unification of the provided DAFSAs. The DAFSAs may be combined to create a tree that includes all byte subsets of all byte streams provided to the stream encoding device 240, e.g., the malicious, benign, and unknown byte streams. DAFSAs may be combined, for example, by performing a union of the byte transitions that each allows. This may be performed iteratively, to construct a tree of DAFSAs, so that the root node of the tree is the union of all DAFSAs, corresponding to all byte subsets in the provided byte streams. In some implementations, the tree may be organized so that the malicious byte signatures—which would also be identified by the stream encoding device as a byte subset—are on one side of the tree, while all other byte subsets—e.g., byte subsets from benign and/or unknown byte streams, or non-signature byte subsets from malicious byte streams—are on another side of the tree.

The collision detection device 260 has access to both the byte subset data structure 252, e.g., the byte subset tree described above, and the data structure of malicious signatures 255, e.g., the DAFSA of malicious candidate byte signatures 234. The collision detection device 260 removes, from the data structure of malicious signatures 255, each candidate byte signature 234 that matches a byte subset included in the byte subset data structure 252. For example, the collision detection device 260 may, for each candidate byte signature 234 included in the data structure of malicious signatures 255, determine whether the candidate byte signature matches any other byte subset included in the byte subset tree. Any collision with a data subset that did not come from the same malicious data stream would indicate that the candidate byte signature was not unique. In some implementations, the collision detection device 260 may remove a matching candidate byte signature 272 by instructing the signature generation device 210 to replace the matching candidate byte signature 272.

In the example data flow 220, the collision detection device 260 notifies the signature generation device 210 of the matching candidate byte signature 272. The signature generation device 210 may then identify the malicious byte stream 222, or representative malicious byte stream 232, from which the matching candidate byte signature 272 was obtained. A new candidate byte signature may then be selected for the identified malicious byte stream. For example, the signature generation device 210 may use a set of previously identified candidate byte signatures to choose the next most complex byte signature as the candidate byte signature for the malicious byte stream.

Various portions of the process described with respect to the data flow 220 may be repeated, e.g., until distinct candidate byte signatures are identified for the data structure of malicious signatures 255. As noted above, to be distinct, candidate byte signatures need not be unique. In some implementations, a candidate byte signature 234 with the least collisions, which may be determined based on the number of byte streams that include a byte subset that collided with candidate byte signature 234, may be selected as the distinct candidate byte signature for its corresponding malicious byte stream. In some implementations, other combinations of distinctness and complexity may be used to identify a distinct byte signature. For example, a cost may be associated with each match or collision with byte subsets, e.g., with matches to known benign byte subsets having a relatively high cost compared to matches to unknown byte subsets from unknown or malicious byte streams. In this situation, a cost of matches/collisions may be used to identify a distinct signature.

New byte streams, including malicious, unknown, and benign byte streams, may be periodically added to a system that implements the process for identifying distinct byte signatures described above. In this situation, new signatures may be obtained, new byte subsets may be obtain, data structures may be altered, and the collision detection may cause new candidate byte signatures to be selected for various malicious byte streams, both new malicious byte streams and old malicious byte streams. In other data set and data set signature contexts, the same is true. For example, in the gene sequencing context, additional gene sequences may be periodically added to a system that identifies distinct signatures for particular gene sequences.

Figure 3:
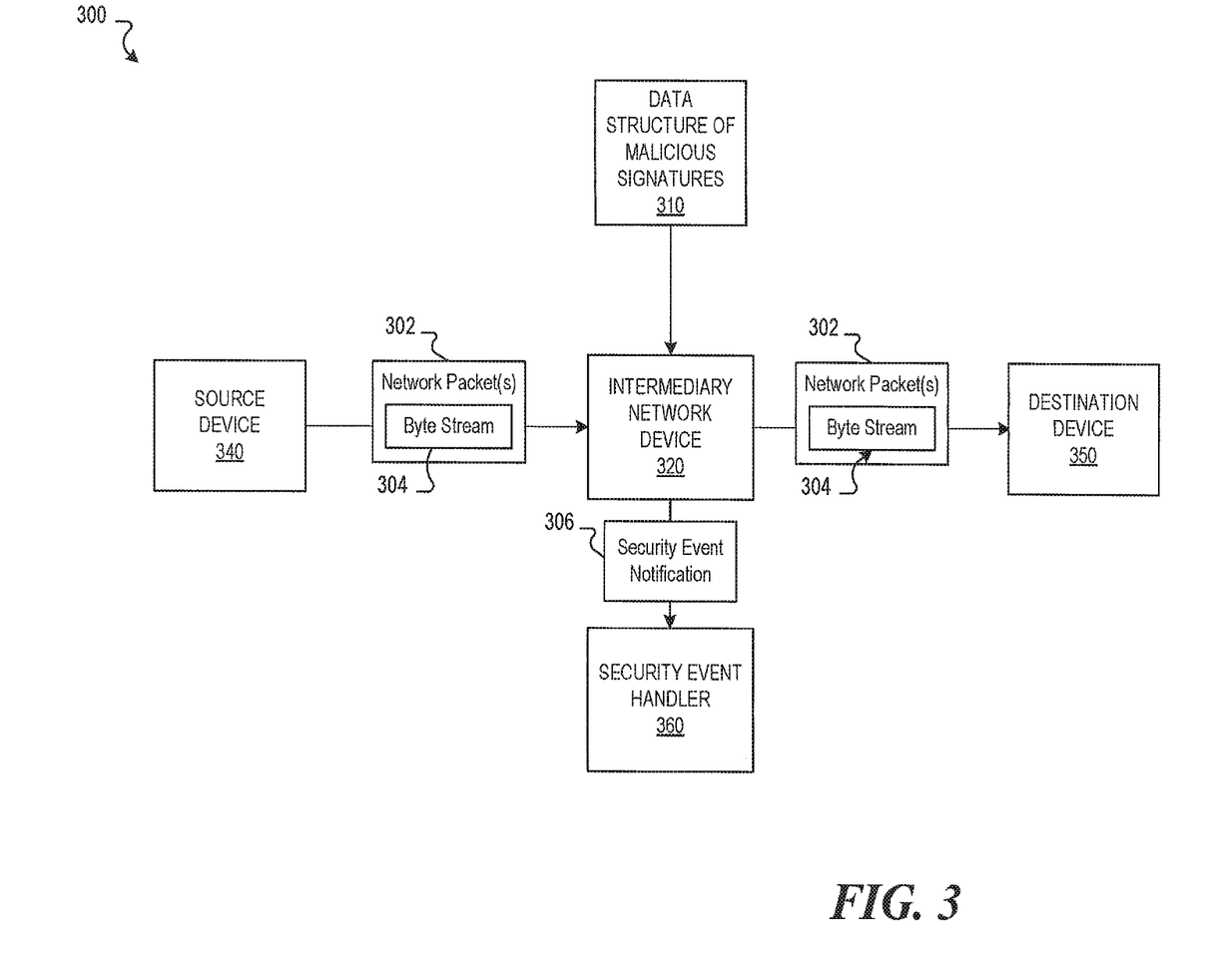
FIG. 3 is an example data flow for using signatures identified for data sets.

FIG. 3 is an example data flow 300 for using signatures identified for data sets. The uses for data signatures may vary greatly, and the uses may depend upon the context. For example, literature signatures may be used to detect plagiarism in new works of literature, gene signatures may be used to determine traits likely to be associated with new gene sequences, biometric signatures may be used to identify when new biometric data matches a known biometric signature, and malicious byte signatures may be used to identify previously unidentified byte streams as malicious byte streams. In the example data flow 300, a data structure of malicious signatures 310 generated using the methods described above is used to identify potentially malicious byte streams.

The example data flow 300 includes an intermediary network device 320, which may be any device capable of using the data structure of malicious signatures 310 to identify potentially malicious byte streams. Examples include, for example, software defined network elements, server computers, personal computers, or network switches. The example intermediary network device 320 may be, for example, a software defined network element that includes programmable hardware, such as an FPGA, and is configured to operate as a network switch.

In this example use case, the intermediary network device 320 receives, from a source device 340, one or more network packets 302 which include a byte stream 304. The source device 340 may be any device capable of network communications, e.g., a network router or switch, a server computer, or a personal computer. In some situations, the byte stream 304 may be span multiple network packets 302 and may, in some implementations, include the data comprising the network packets 302. Examples include files split across multiple network packets and code included in particular portion of a single network packet or spread across multiple network packets in a particular portion of each network packet.

The intermediary network device 320 uses the data structure of malicious signatures 310 to determine whether the byte stream 304 matches a malicious byte signature included in the data structure of malicious signatures 310. For example, the data structure of malicious signatures 310 may be in the form of a DAFSA through which the programmable hardware of the intermediary network device 320 checks for a match in byte subsets of the byte stream 304. In situations where no match is detected, the network packet(s) 302 and included byte stream 304 may be processed normally, e.g., by forwarding the network packet(s) 302 to their intended destination, e.g., destination device 350.

In situations where a match is detected, the intermediary network device 310 may perform a variety of actions, e.g., depending upon its configuration. In the example data flow 300, the intermediary network device 320 is configured to send a security event notification 306 to a security event handler 360. The notification 306 may include a variety of information, such as the identified byte stream 304, the network packet(s) 302 that include the byte stream 304, an identifier of the malicious byte signature that was matched, and/or information related to the source device 340. Other example actions taken by the intermediary network device 320 in response to identifying a match with a malicious byte signature may include preventing transmission of the network packet(s) 302 that include the byte stream 304 and/or preventing transmission of future network packets received from the same source device 340 or from a same source identified in the network packet(s) 302.

Figure 4:
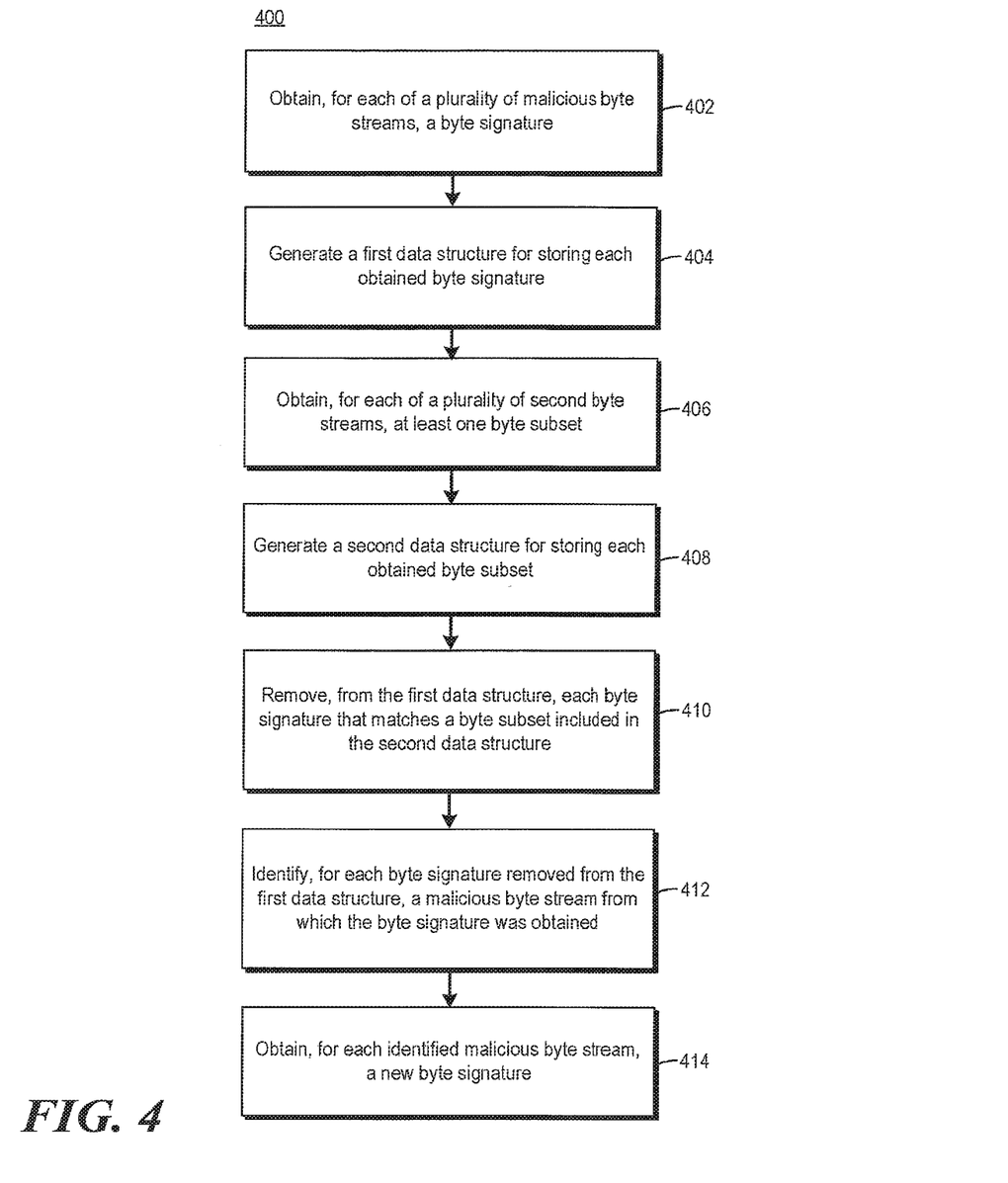
FIG. 4 is a flowchart of an example method for identifying signatures for data sets.

FIG. 4 is a flowchart of an example method 400 for identifying signatures for data sets. The method 400 may be performed by a computing device, such as a computing device described in FIG. 1. Other computing devices may also be used to execute method 400. Method 400 may be implemented in the form of executable instructions stored on a machine-readable storage medium, such as the storage medium 120, and/or in the form of electronic circuitry, such as a field-programmable gate array (FPGA) and/or an application-specific integrated circuit (ASIC). Combinations of one or more of the foregoing processors may also be used to identify signatures for data sets.

For each of a plurality of malicious byte streams, a byte signature is obtained (402). For example, the malicious byte streams may be malicious computer files, and the malicious byte signatures may be complex subsets of the malicious byte streams.

A first data structure is generated for storing each obtained byte signature (404). For example, a deterministic acyclic finite state automata (DAFSA) may be generated for the obtained byte signatures, and each byte signature is included in the DAFSA.

For each of a plurality of second data streams, at least one byte subset is obtained (406). The second data streams may include, for example, any combination of benign, malicious, and/or unknown computer files. The at least one byte subset may include any or all byte subsets of the second data streams, e.g., obtained by selecting multiple windows of contiguous byte subsets from each computer file.

A second data structure is generated for storing each obtained byte subset (408). For example, each byte subset obtained from each computer file may be included in a DAFSA, and the DAFSAs of each computer file may be combined into a single tree that includes all of the byte subsets obtained for the computer files. In some implementations, the second data structure indicates, for each byte subset, a number of the second byte streams that included the byte subset. For example, each byte subset may be associated with the number of computer files that included the byte subset, e.g., determined when each computer file's DAWG is combined into the byte subset tree.

Each byte signature that matches a byte subset included in the second data structure is removed from the first data structure (410). For example, if a malicious byte signature is included in the tree, it is removed from the malicious signature DAFSA.

For each byte signature removed from the first data structure, a malicious byte stream from which the byte signature was obtained is identified (412). For example, the malicious computer file from which the malicious byte signature was obtained is identified.

For each identified malicious byte stream, a new byte signature is obtained (414). For example, a different byte signature associated with the identified malicious computer file is obtained, e.g., for inclusion in the malicious signature DAFSA in place of the removed byte signature.

In some implementations, the method 400 includes identifying a particular malicious byte stream for which each of a plurality of candidate byte signatures match a byte subset included in the second data structure. For example, a particular malicious computer file may have candidate byte signatures that each match a byte subset included in the byte subset tree, e.g., no unique candidate byte signatures. In this situation, the method 400 may include adding, to the first data structure, a distinct candidate byte signature of the plurality of candidate byte signatures of the particular malicious byte stream. The distinct candidate byte signature is the candidate byte signature having a matching byte subset for which a least cost of second byte stream matches are indicated. For example, when a malicious computer file has no unique byte streams, a candidate byte stream may still be selected for the malicious computer file based on the number of computer files that included byte subsets that matched the candidate byte streams and the status of the matching byte subsets, e.g., cost may be higher for matches with benign subsets than matches with unknown or malicious subsets.

The foregoing disclosure describes a number of example implementations for identifying signatures for data sets. As detailed above, examples provide a mechanism for identifying data signatures based on distinctiveness and potential applications of a system that is capable of identifying signatures for data sets.

We claim:

1. A non-transitory machine-readable storage medium encoded with instructions executable by a hardware processor of a computing device for identifying signatures for data sets, the machine-readable storage medium comprising instructions to cause the hardware processor to:

for each of a plurality of first data sets, obtain a data set signature;

generate a first data structure for storing each data set signature that is distinct from each other data set signature obtained for the plurality of first data sets;

for each of a plurality of second data sets, obtain at least one data subset;

generate a second data structure for storing each data subset that is obtained from the second data sets;

remove, from the first data structure, each data set signature that matches a data subset included in the second data structure; and for each data set signature removed from the first data structure, identify each first data set from which the data set signature was obtained; and for each identified first data set, obtain a new data set signature.

2. The storage medium of claim 1, wherein the instructions further cause the hardware processor to:

receive a new data set; and determine, using the first data structure, whether the new data set matches a data set signature.

3. The storage medium of claim 1, wherein each data set signature has a signature length that matches a subset length of each data subset.

4. The storage medium of claim 1, wherein the first data structure is a deterministic acyclic finite state automata.

5. The storage medium of claim 1, wherein:

each of the plurality of first data sets has a plurality of data set signatures, and for each first data set, data set signatures are obtained based on a measure of complexity associated with each data set signature.

6. The storage medium of claim 5, wherein:

data set signatures of each of the plurality of first data sets are ranked based the measures of complexity associated with the data set signatures.

7. The storage medium of claim 1, wherein the instructions further cause the hardware processor to:

obtain a collection of first data sets;

group each first data set included in the collection into one of a plurality of groups based on measures of similarity between first data sets;

select, from each of the plurality of groups, one first data set as a representative data set for the group, and wherein each the plurality of first data sets includes the selected first data sets.

8. The storage medium of claim 1, wherein the instructions further cause the hardware processor to:

determine that each data set signature of a plurality of data set signatures of a particular first data set matches a data subset included in the second data structure; and in response to the determination, select one of the plurality of data set signatures of the particular first data set for inclusion in the first data structure, the selection being based on a number of second data sets that include a data subset that matches the selected data set signature.

9. A method for identifying byte signatures for byte streams, implemented by a hardware processor, the method comprising:

obtaining, for each of a plurality of malicious byte streams, a byte signature;

generating a first data structure for storing each obtained byte signature that is distinct from each other obtained byte signature;

obtaining, for each of a plurality of second byte streams, at least one byte subset, the plurality of second byte streams comprising malicious, benign, and unknown byte streams;

generating a second data structure for storing each obtained byte subset;

removing, from the first data structure, each byte signature that matches a byte subset included in the second data structure; and identifying, for each byte signature removed from the first data structure, a malicious byte stream from which the byte signature was obtained; and obtaining, for each identified malicious byte stream, a new byte signature.

10. The method of claim 9, wherein the second data structure indicates, for each byte subset, a number of the second byte streams that included the byte subset.

11. The method of claim 10, further comprising:

identifying a particular malicious byte stream for which each of a plurality of candidate byte signatures match a byte subset included in the second data structure; and adding, to the first data structure, a distinct candidate byte signature of the plurality of candidate byte signatures of the particular malicious byte stream, the distinct candidate byte signature being the candidate byte signature having a matching byte subset for which a least cost of second byte stream matches is indicated.

* * * * *